(No Model.) 6 Sheets—Sheet 1.

B. H. COFFEY.
GAS ENGINE VALVE GEAR.

No. 517,541. Patented Apr. 3, 1894.

WITNESSES:

INVENTOR:
Barton H. Coffey

BY _____ ATTY (No Model.) 6 Sheets—Sheet 2.
B. H. COFFEY.
GAS ENGINE VALVE GEAR.
No. 517,541. Patented Apr. 3, 1894.
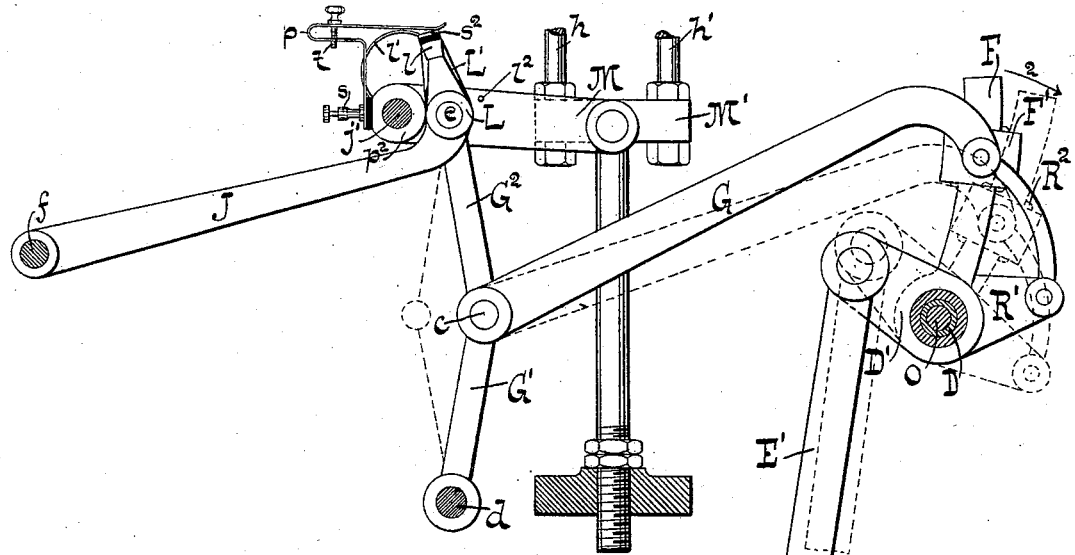
Fig.3.
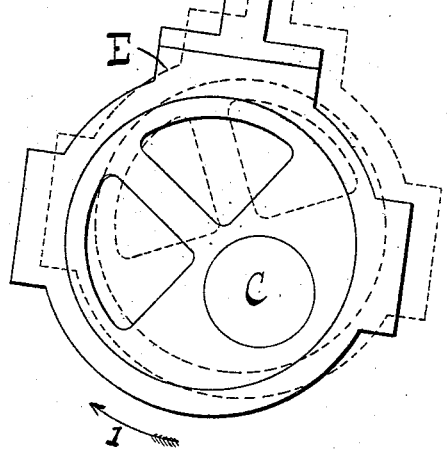
WITNESSES:
INVENTOR
Barton H Coffey
BY ATTY

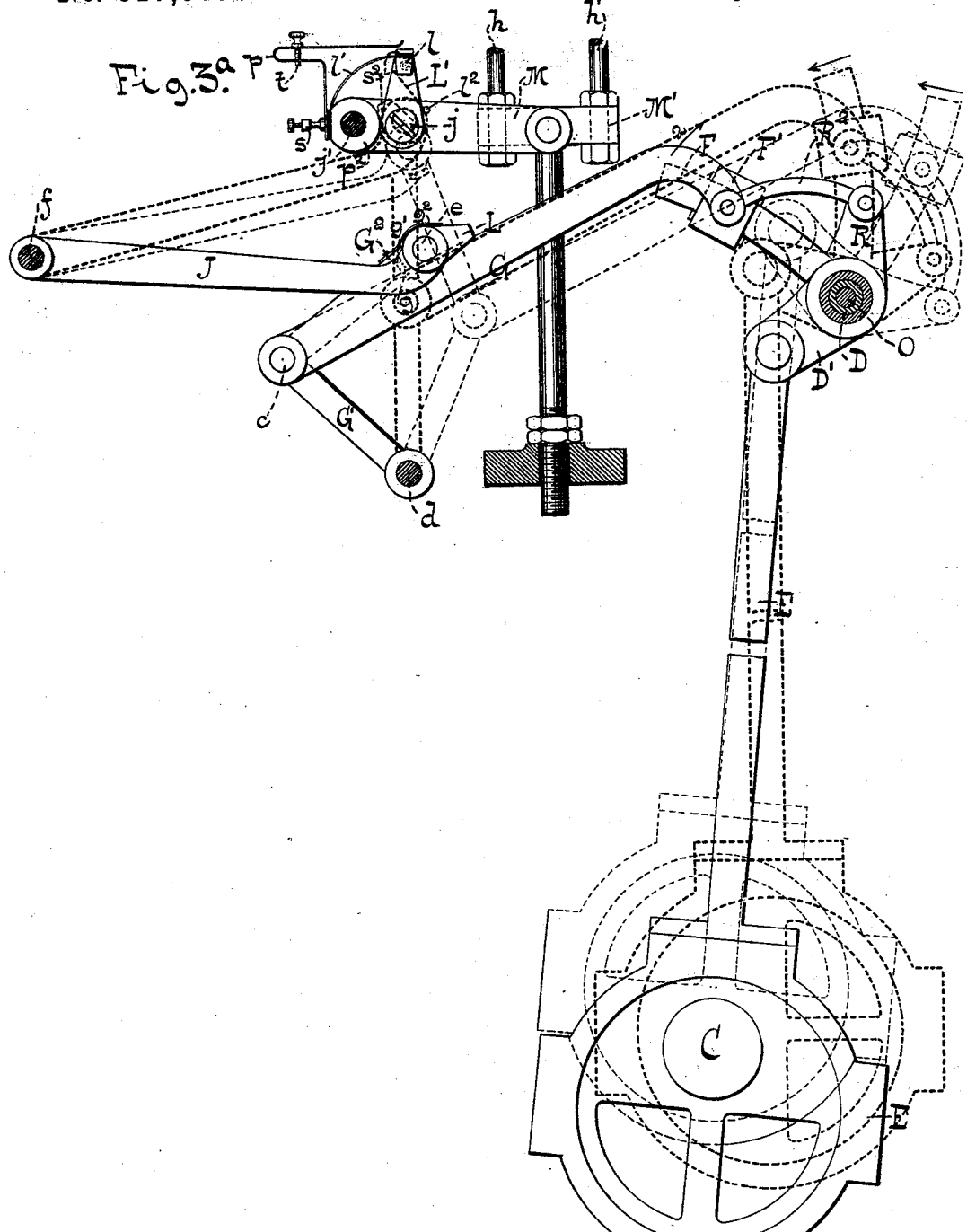

(No Model.) 6 Sheets—Sheet 4.
B. H. COFFEY.
GAS ENGINE VALVE GEAR.
No. 517,541. Patented Apr. 3, 1894.
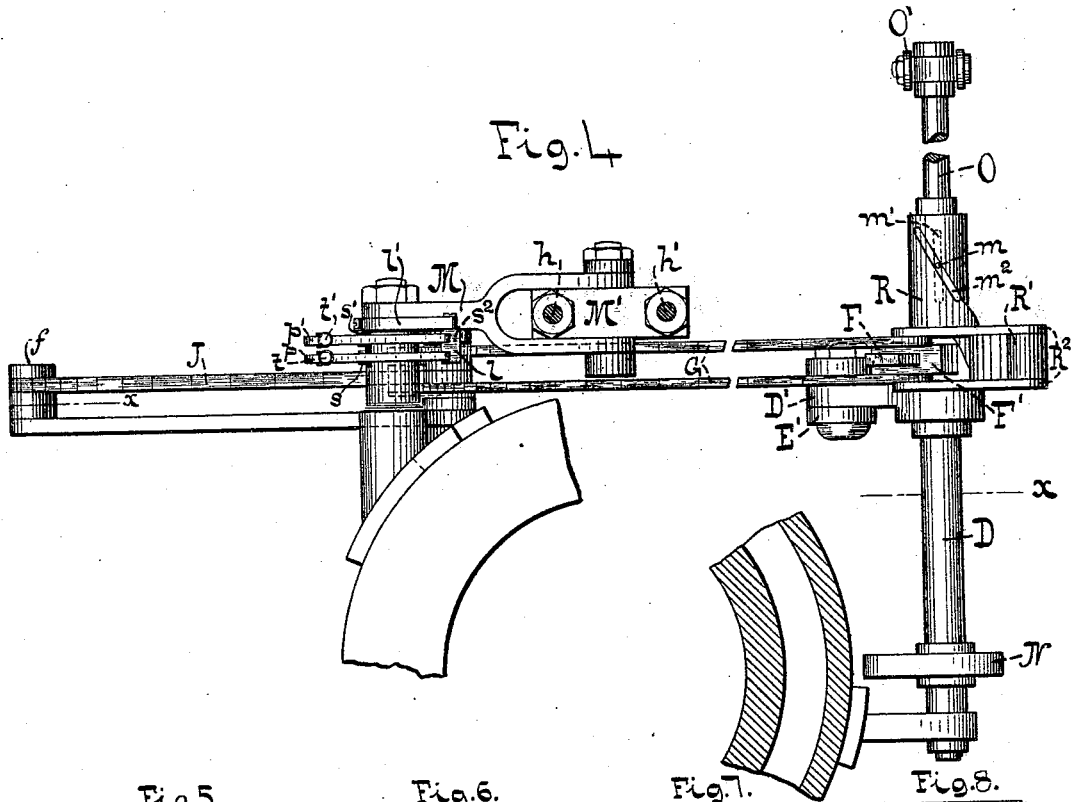
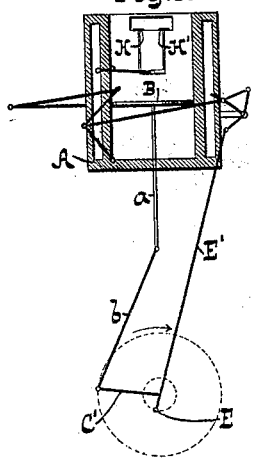 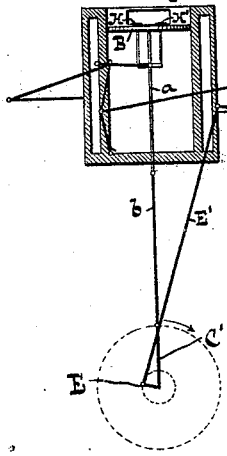 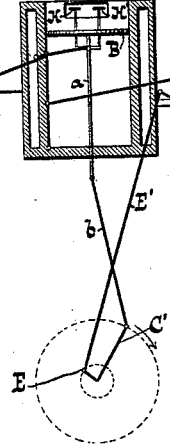 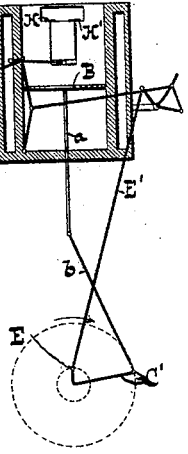
WITNESSES:
INVENTOR:
Barton H. Coffey
BY _____ ATTY (No Model.) 6 Sheets—Sheet 5.
B. H. COFFEY.
GAS ENGINE VALVE GEAR.
No. 517,541. Patented Apr. 3, 1894.
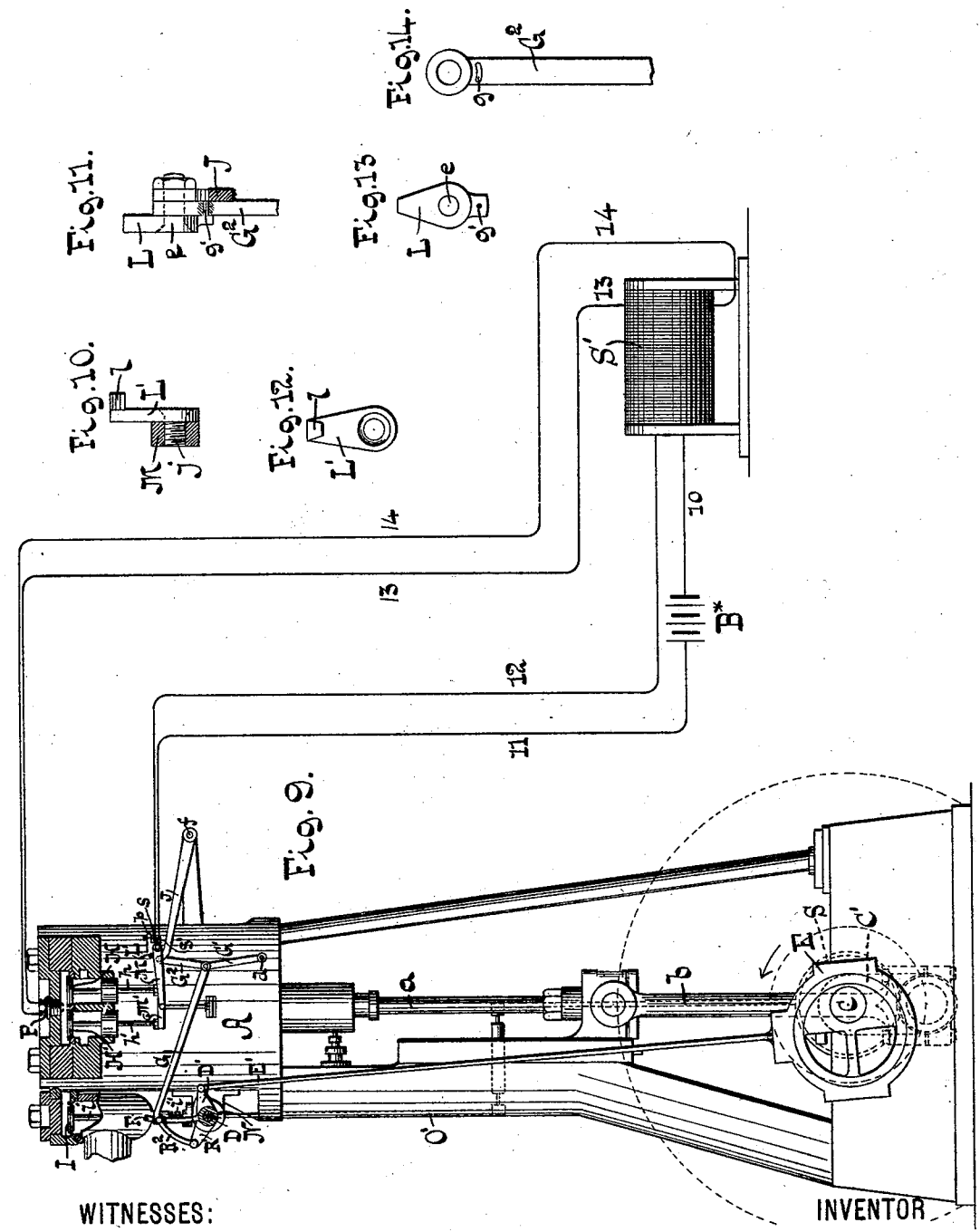
WITNESSES:
INVENTOR
Barton H. Coffey
BY _____ ATTY

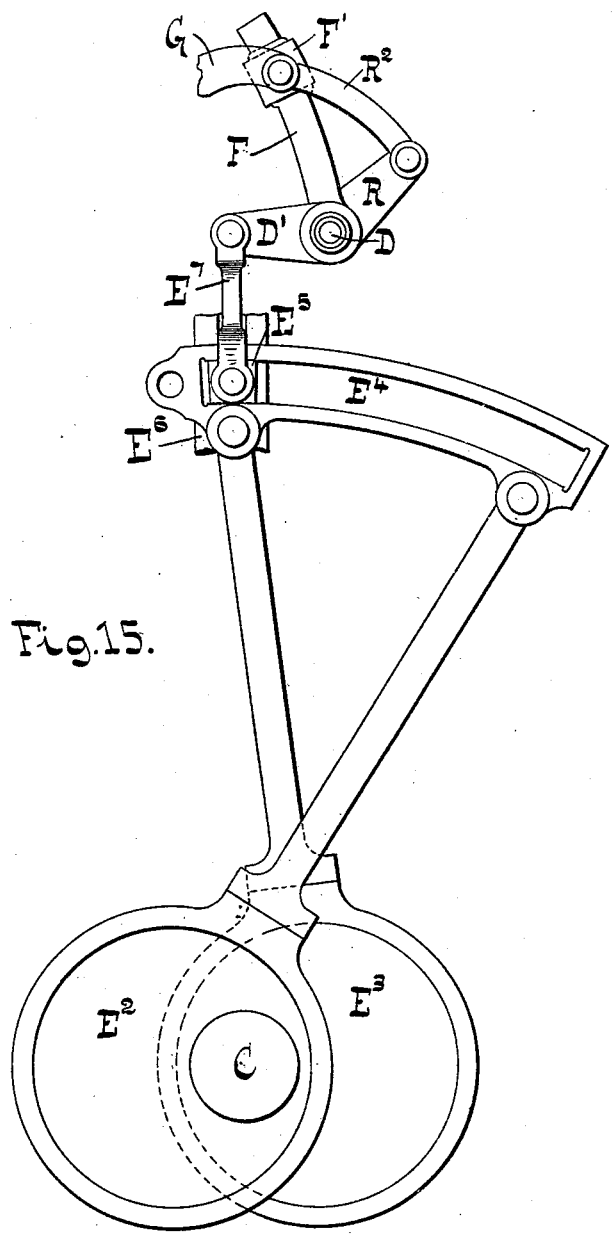

UNITED STATES PATENT OFFICE.

BARTON H. COFFEY, OF NEW YORK, N. Y.

GAS-ENGINE VALVE-GEAR.

SPECIFICATION forming part of Letters Patent No. 517,541, dated April 3, 1894.

Application filed December 2, 1892. Serial No. 453,871. (No model.)

*To all whom it may concern:*

Be it known that I, BARTON H. COFFEY, a citizen of the United States, and a resident of New York, in the county and State of New York, have invented certain new and useful Improvements in Gas-Engine Valve-Gears, of which the following is a specification.

My invention has reference to valve gears, and especially to that type intended for the control of puppet valves in gas engines,—and it consists in certain improvements in the design and arrangement of the several operating members of the valve gears;—said improvements having for their object to bring the admission valve gradually to its seat, thereby avoiding shock and the use of dash pots; to allow a variation in the point of cut off dependent on the load; to provide for a constant point of admission irrespective of changes in the point of cut-off; to insure the closing of the admission valves before ignition of the explosive charge; to ignite the charge at the point of cut off irrespective of how said cut off may vary; and finally preventing variation in the point of cut off from affecting the exhaust in any way.

The nature of my said improvements will best be understood as described in connection with the accompanying drawings, in which—

Figure 1:
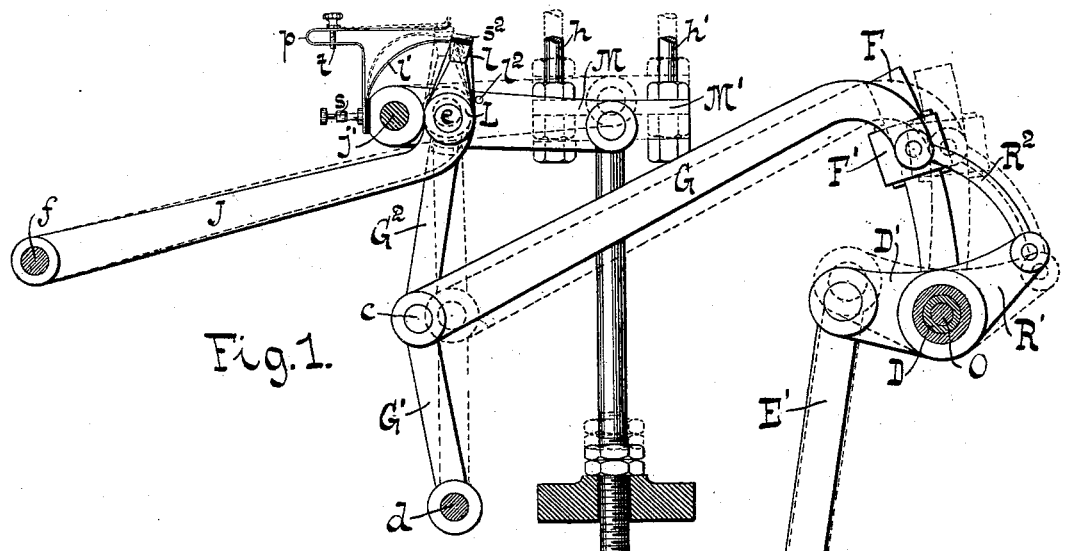
Figure 2:
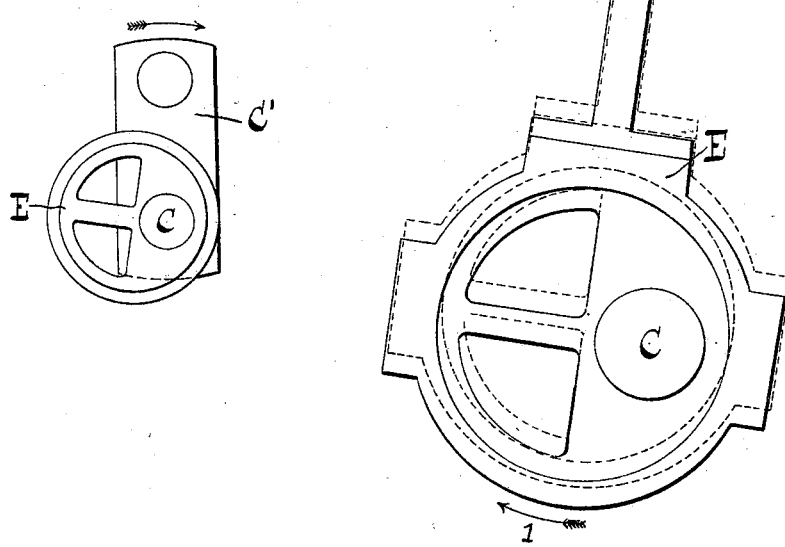

Figure 1 represents a sectional elevation of a valve gear constructed in accordance with my invention, the section being taken on the line *x x*, Fig. 4. Fig. 2 is a detail showing the positions of crank and eccentric. Figs. 3 and 3$^a$ are views similar to Fig. 1, but showing the parts in different relative positions. Fig. 4 is a plan or top view of the valve gear partly in section. Figs. 5 to 8 inclusive are diagrams illustrating the operation of the valve gear. Fig. 9 is a sectional elevation showing the valve gear applied to a gas engine, said figure being drawn to a smaller scale than Fig. 1. Figs. 10 to 14 inclusive are views of detail parts. Fig. 15 is an elevation illustrating a reversing gear embodying my invention.

Similar letters and numerals of reference indicate corresponding parts throughout the several views of the drawings.

In the example illustrated in the drawings I have shown the valve gear as intended for application to a gas engine, but of course it is to be understood that it can be applied equally well to any other type of engine employing puppet or equivalent valves.

Reference being had at present to Fig. 9 for a brief description of the gas engine,—the letter A designates one of the single acting cylinders of a gas engine, C, the crank shaft, C', the crank, $a$ the piston rod, and $b$ the connecting rod. H H' are the admission valves,— the one H for air and the other H' for gas. I is the exhaust valve and P the igniter which in this instance I have shown to be an electric igniter.

Referring to Figs. 1 and 4 I will now proceed to describe the means for operating the admission valves. In these figures the letter D designates a horizontal tubular rock-shaft mounted in suitable bearings on the frame of the engine and carrying a rocker arm D', which latter is connected to the eccentric E, mounted on the crank shaft C, by the rod E'. To the rock shaft is also secured a quadrant F, upon which is mounted to slide thereon a block F', which latter in turn is connected to the lifting lever by a radius rod G. The lifting lever I have in this example shown as a toggle lever G' G$^2$, to the pivot $c$ of which the radius rod is connected. One member G' of said lever is arranged to turn about a fixed pivot $d$, while the other member G$^2$ is connected by a pivot $e$ to a radius arm J. The latter is pivoted at $f$ and consequently constrains the pivot $e$ of member G$^2$ to move in an arc having a radius equal to the length of arm J. On the pivot $e$ of the lever G' G$^2$ is mounted a lifting toe L, which has a pin and slot connection $g$ $g'$ with the member G$^2$, which connection permits the toe to turn about the pivot to a limited extent:—a spring $g^2$, Fig. 3$^a$ holds the toe in line with the member G$^2$ by pressing the pin $g'$ against the end of slot $g$. The valve lever M, which is connected with the valves, and serves to lift and close the same has its fulcrum at the fixed journal $j'$, its outer end being pivoted to the T bar M' which transmits its motion to the valve stems $h$ $h'$. Between the journal $j'$ and the T bar is pivoted at $j$ a trigger L', which is held in a fixed position by a spring $l'$ and a stop $l^2$. On the end of the trigger is formed a projecting catch $l$ located in the path of the end of the lifting toe L for the purpose of engaging the same.

For opening the exhaust valve I, Figs. 4 and 9, there is mounted upon the shaft D to vibrate therewith, a cam N, with which the stem $i$ of the exhaust valve is held in contact by a spring $i'$. For automatically changing the position of block F′ on the quadrant F to vary the point of cut off with the load, said block is connected by any suitable means with a governor.

Referring now to Figs. 4 and 9 where I have illustrated means for effecting a variable cut-off, the letter S Fig. 9 designates a shaft governor mounted on the crank shaft of the engine. O, Fig. 4 designates a rod adapted to slide longitudinally within the tubular shaft D and connected at one end with the governor S by a lever O′. A pin $m$ secured in the rod passes through a longitudinal slot $m'$ in the tubular shaft D and enters an oblique slot $m^2$ in a sleeve R encompassing the shaft D. When the rod O is moved longitudinally within the shaft D by the action of the governor, the sleeve R is turned relatively to the shaft D by reason of the pin and slot connection $m$ $m^2$. From the sleeve projects an arm R′ that is connected with the block F′ by a link R². It will be noticed that the rod O, shaft D and sleeve R vibrate together, but that the longitudinal motion of the rod O turns the sleeve R relatively to the shaft D, which motion is transmitted by the arm R′ and link R² to the block F′, and its position on the quadrant F is changed. In order that the admission of the charge to the cylinder shall take place always at the same point of the cycle irrespective of the point of cut-off effected by the position occupied by the block F′ upon the quadrant F, I form the said quadrant in an arc whose radius is equal to the length of the radius rod G, or the distance from point $c$ to O, when the toe L has just engaged the trigger arm L′, (see solid lines in Fig. 1.) Under these conditions any movement of the block F′ along the quadrant F will not affect the position of the center or pivot $c$, and therefore will not affect the admission valves when the pivot is in this position.

I will now proceed to describe the operation of the valve gear. Beginning with the admission of the charge, the engine, as indicated by solid lines in Figs. 1 and 6, is on its upper dead center with the piston B in the corresponding position and the eccentric substantially ninety degrees behind the crank. The lifting toe has just engaged the catch $l$ of the trigger L′; continued movement of the engine in the direction of the arrows causes the quadrant to swing back, as shown by broken lines in Fig. 1, thereby drawing the members of the toggle lever G′ G² in line by means of the radius rod G and causing the valve lever M to be raised by means of toe L and trigger L′. In consequence thereof the valves connected with the valve lever by the T bar M′ are opened. This position is also shown in Fig. 7. On further movement of the engine the eccentric causes the toggle lever to lower the valve lever M until the valves are closed. This position is indicated by full lines in Fig. 3 and also in Fig. 8, and is the position of the parts at the point of cut off. In attaining the point of cut off the center pivot $c$ of the toggle lever G′ G² is the same distance from its mid position but on the opposite side from what it was at admission, as will be seen by comparison of full lines in Figs. 1 and 2, consequently the toe L has traveled through this angular distance, carrying with it the trigger L′, as will be seen from Fig. 3. The pressure of the admission valves transmitted through lever M causes sufficient friction between the top of toe L and catch $l$ to carry over the trigger L′ in opposition to spring $l^2$, but as soon as the toe begins to leave the catch $l$, which happens as soon as the downward movement of lever arm M ceases, due to the seating of the valves, the trigger L′ snaps back to its original position by action of spring $l'$ (see full lines in Fig. 3ª). On the return stroke, after the members of the toggle lever G′ G² have been brought into line, the lifting toe L must pass beneath the catch $l$ of the trigger L′. This is effected by the swiveling of the toe around pin $e$, (see heavy dotted lines in Fig. 3ª.)

The variable cut off is accomplished as follows:—It will be observed that the angularity of the toggle lever at admission and cut off is the same and constant (see Figs. 1, 3, 6 and 8), consequently the linear movement of center pivot $c$ to effect this result is constant. Now it will be observed that the farther the block F′ is removed from center of shaft D the smaller will be the angular movement of the eccentric necessary to effect a given lineal movement of the block F′, (compare solid lines and broken lines in Fig. 3,) and as the block is directly connected through radius rod G to the center pivot $c$, the cut off will necessarily therefore be earlier the farther the block F′ is removed from the center D. The exhaust valve, as before stated, is operated by the cam N secured to the shaft D, and as this latter has a constant motion the exhaust is necessarily unaffected by any change in the point of cut off.

I will now proceed to describe the means for igniting the charge in connection with the valve gear. The letters $p$ $p'$ designate two spring contacts secured to the stationary bearing of the valve lever M by binding posts $s$ $s'$ properly insulated from the bearing. The contact springs extend upwardly and over the top of the trigger L′, which latter is provided with a contact surface $s^2$ insulated from said trigger and extending across the range of the contact springs $p$ $p'$. Screws $t$ $t'$ serve to adjust the contact springs $p$ $p'$ with respect to the contact surface $s^2$.

Referring now to Fig. 9, S′ designates an induction coil and B a battery. One wire 10 from the battery is connected with the primary coil of the induction coil and the other wire 11 to one binding post $s$; the other binding post $s'$ is connected by wire 12 to the opposite end of the primary coil of the induction coil. The terminals of the secondary coil of the induction coil are connected respectively by wires 13 and 14 to the binding posts of the igniter plug P. The terminals of the contact springs $p$ $p'$ are so arranged with respect to the trigger L' that when the valves of the engine are lifted (see broken lines in Fig. 1) the circuit of battery B is closed at $p$ $p'$ $s^2$; when the valves are down on their seats, the trigger L' is quickly returned against stop $l^2$ by the spring $l'$ as hereinbefore described, whereby the circuit of battery B is broken at $p$ $p'$ $s^2$ and the charge is ignited by the passage of a spark between the terminals at the igniter plug P at the point of cut-off (Fig. 3).

Referring now to Fig. 15, where I have shown my invention embodied in a reversing gear, the letters $E^2$ $E^3$ designate two eccentrics set at an angle of one hundred and eighty degrees and connected with the opposite ends of a link $E^4$ in which is fitted a link block $E^5$ guided in vertical ways $E^6$. The link block is connected by a link $E^7$ with the rocker arm D' of rock shaft D.

The remaining parts of the valve gear are identical with those before described. By shifting the link, one or the other of the eccentrics is thrown into action as usual.

It is evident that modifications may be made in the mechanical construction of the several parts of the valve gear shown, without departing from the spirit of my invention;—for instance in place of having the lifting lever G' G² in the form of a toggle lever, it may consist simply of the arm G² and the connecting pin or pivot $c$ made to travel in a circular arc corresponding to the length of lever G', by causing the pin to enter a correspondingly curved groove formed in a suitable base. The arm J could in a like manner be dispensed with and a corresponding groove provided for the pivot $e$. It will also be seen that lever M could be omitted and the admission valves placed in operative connection with the trigger L', since the function of the lever M is chiefly to multiply the motion of the trigger so as to obtain an increased lift of the valves. It is also apparent that the governing feature could be omitted as regards its application to the valve gear, thereby permitting the rod G to be directly pivoted to the rocker arm and thus dispensing with the movable block F'.

What I claim as new, and desire to secure by Letters Patent, is—

1. In a gas engine, the combination with the igniting device of an eccentric, a rocker shaft actuated from the same, a lifting lever, a radius rod connecting the same with the rocker shaft, a trigger in operative connection with the admission valve (or valves), a toe on the lifting lever adapted to engage the trigger to lift the same for opening the valve, and means for constraining the motion of the lifting lever in a fixed path, as described, whereby the valve is gradually brought to its seat on the return stroke of the lifting lever, substantially as described.

2. In a gas engine, the combination with the igniting device of an eccentric, a quadrant actuated from the same, a block movably mounted on the quadrant, a toggle lever, a radius rod connecting the same with the block, a trigger in operative connection with the admission valve (or valves), a toe on the lifting lever adapted to lift the same for opening the valve, means for constraining the motion of the toggle lever in a determined path, a governor, and intermediate connections between the same and the block for varying the point of cut off with the load, substantially as described.

3. In a gas engine, the combination with the igniting device of an eccentric, a quadrant actuated from the same, a block movably mounted on the quadrant, a toggle lever, a radius rod connecting the joint of the toggle lever with the block, a radius bar connected with the free end of the lever, a trigger carried by a lever in operative connection with the admission valve (or valves), a lifting toe carried by the toggle lever and adapted to engage with the trigger to lift the admission valve, a governor, and an intermediate connection between the governor and the quadrant block, substantially as described.

4. In a gas engine, the combination with the igniting device of the eccentric, a tubular rock shaft, a quadrant actuated from the same, a movable block on the said quadrant, a rod passing through the rock shaft, a sleeve mounted on the rock shaft and provided with an oblique slot, a pin on the rod passing through a slot in the rock shaft and entering the oblique slot in the sleeve, an operative connection between the quadrant block and the sleeve, a governor, and a connection between the same and the rod for moving the same longitudinally with variations in the load, substantially as described.

5. In a gas engine, the combination with the igniting device of an eccentric, a rock shaft actuated from the same, a quadrant and block, a valve lever connected with the same by an intermediate operative connection, and a cam mounted on the rock shaft and engaging the exhaust valve, substantially as described.

6. In a gas engine, the combination with the igniting device the combination of the trigger and its actuating mechanism, as described a contact surface on said trigger, stationary contacts, a battery, an induction coil, and an igniting plug, said stationary contacts being arranged relatively to the contact of the trigger to break the circuit at the point of cut off, to explode the charge, substantially as described.

7. In a gas engine, the combination with the igniting device of the pivoted trigger L' in operative connection with the admission valve (or valves), and a lifting toe constrained to move in an arc and adapted to lift the trip arm when moved in one direction, said trigger being held to the toe during the retrograde movement by the pressure of the valve to gradually cause said valve to be brought to its seat, substantially as described.

8. In a gas engine, the combination with the igniting device of the toggle lever $G'$ $G^2$, the lifting toe L, the trigger $L'$ in operative connection with the admission valves, and means for operating the same, substantially as and for the purpose set forth.

9. In a gas engine, the combination with the igniting device of the toggle lever $G'$ $G^2$, the movable lifting toe L, the trigger $L'$, the lever M in operative connection with the admission valves, and means for operating the same, substantially as and for the purpose set forth.

10. In a gas engine, the combination with the igniting device of the toggle lever $G'$ $G^2$, the movable lifting toe L, the trigger $L'$, the multiplying lever M in operative connection with the admission valves, the radius rod G, the rock arm or quadrant F, the rock shaft D and means for operating the same, substantially as and for the purpose set forth.

11. In a gas engine, the combination with the igniting device, of the quadrant F, a block $F'$ fitted to slide thereon, a connection between said block and the admission valve of the engine for operating the same, a governor and a connection between the latter and the block, whereby the block is shifted upon the quadrant to vary the point of cut off of said valve with the load, substantially as described.

12. The combination of the trigger $L'$ with contact surface $s^2$, of the trigger actuating mechanism as described the contact springs $p\ p'$, the igniting plug P, an induction coil, a battery and electrical connections, substantially as and for the purpose set forth.

13. In combination with the trigger $L'$, and its actuating mechanism as described an igniting plug P, an induction coil, contact springs, a battery and electrical connections whereby the circuit is broken through one coil of the induction coil to induce the passage of a spark at the igniting plug, at the point of cut off, substantially as described.

14. In a gas engine, the combination with the igniting device, of a lifting lever, the movable lifting toe carried by the same and constrained to move in a fixed path, the trigger $L'$ in operative connection with the valves and adapted to be engaged by the lifting toe, and means for operating the same, substantially as described.

In testimony that I claim the foregoing as my invention I have signed my name, in presence of two witnesses, this 22d day of November, 1892.

BARTON H. COFFEY.

Witnesses:
KLAS H. TERNSTEDT,
J. J. MALLE.